(12) United States Patent
Rohrbacher

(10) Patent No.: US 11,003,242 B2
(45) Date of Patent: May 11, 2021

(54) EYE TRACKING

(71) Applicant: Harman Becker Automotive Systems, GmbH, Karlsbad-Ittersbach (DE)

(72) Inventor: Adam Rohrbacher, Stuttgart (DE)

(73) Assignee: Harman Becker Automotive Systems GmbH

( * ) Notice: Subject to any disclaimer, the term of this patent is extended or adjusted under 35 U.S.C. 154(b) by 198 days.

(21) Appl. No.: 16/303,742

(22) PCT Filed: May 16, 2017

(86) PCT No.: PCT/EP2017/061666
§ 371 (c)(1),
(2) Date: Nov. 21, 2018

(87) PCT Pub. No.: WO2017/202640
PCT Pub. Date: Nov. 30, 2017

(65) Prior Publication Data
US 2020/0319705 A1   Oct. 8, 2020

(30) Foreign Application Priority Data
May 24, 2016   (EP) .................................... 16171074

(51) Int. Cl.
*G06F 3/01*   (2006.01)
*G06F 3/0484*   (2013.01)

(52) U.S. Cl.
CPC .............. *G06F 3/013* (2013.01); *G06F 3/017* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 9,720,456 B1 * | 8/2017 | Karakotsios | G06F 1/1694 |
| 2012/0083312 A1 * | 4/2012 | Kim | G02B 13/001 |
| | | | 455/556.1 |
| 2014/0129987 A1 | 5/2014 | Feit et al. | |
| 2014/0372957 A1 | 12/2014 | Keane et al. | |
| 2015/0074602 A1 | 3/2015 | VanBlon et al. | |
| 2015/0113454 A1 | 4/2015 | McLaughlin | |
| 2018/0032132 A1 * | 2/2018 | Sudou | G06F 3/002 |

FOREIGN PATENT DOCUMENTS

| | | | |
|---|---|---|---|
| JP | WO/2016/136837 | * | 2/2016 |
| WO | WO 2015/039746 | | 3/2015 |

* cited by examiner

*Primary Examiner* — Aneeta Yodichkas
(74) *Attorney, Agent, or Firm* — Angela M. Brunetti

(57) ABSTRACT

A first user action (201) comprising an eye gaze (211) is detected. At least one menu item from a plurality of menu items is selected based on the orientation (212) of the eye gaze (211) of the first user action (201). A second user action (202) is detected. Based on the second user action (202), a function (209) associated with a given one of the at least one first menu item is activated.

18 Claims, 12 Drawing Sheets

401

402

403

404

EYE TRACKING

TECHNICAL FIELD

Examples relate to a method comprising detecting a first user action comprising an eye gaze associated with the eyes of the user, selecting at least one first menu item based on the orientation of the eye gaze, detecting a second user action, and activating a function associated with a given one of the at least one first menu item. Further examples relate to a corresponding device.

BACKGROUND

Eye-tracking technology offers the potential for interacting with a graphical user interface (GUI). E.g., from EP 2 891 953 A2 techniques are known which enable to actuate a GUI based on an eye gaze. However, such techniques face certain limitations. E.g., the flexibility of the user when operating the GUI may be limited.

SUMMARY

Therefore, a need exists for advanced eye tracking techniques. In particular, need exists for eye tracking techniques which enable dynamic activation of menu items of a GUI based an eye gaze.

This need is met by the features of the independent claims. The dependent claims define embodiments.

In an example, a method comprises displaying a GUI. The GUI comprises a plurality of menu items. The method further comprises detecting a first user action. The first user action comprises an eye gaze associated with the eyes of a user. The method further comprises, based on the orientation of the eye gaze of the first user action: selecting at least one first menu item from the plurality of menu items. The method further comprises detecting a second user action. The method fnther comprises activating a function associated with a given one of the at least one first menu item based on the second user action.

In an example, a device comprises at least one display, a memory, and at least one processor. The memory is configured to store program code. The at least one processor is coupled with the memory and the at least one display. The at least one processor is configured to execute the program code. Execution of the program code causes the at least one processor to perform the following: controlling the display to display a GUI comprising a plurality of menu items; detecting a first user action comprising an eye gaze associated with the eyes of a user; based on the orientation of the eye gaze of the first user action: selecting at least one first menu item from the plurality of menu items; detecting a second user action; and, based on the second user action: activating a function associated with a given one of the at least one first menu item.

In an example, a computer program product comprises program code to be executed by at least one processor. Executing the program code causes the at least one processor to perform a method. The method comprises displaying a GUI. The GUI comprises a plurality of menu items. The method further comprises detecting a first user action. The first user action comprises an eye gaze associated with the eyes of a user. The method further comprises, based on the orientation of the eye gaze of the first user action: selecting at least one first menu item from the plurality of menu items. The method further comprises detecting a second user action. The method further comprises activating a function associated with a given one of the at least one first menu item based on the second user action.

The examples described before and hereinafter may be combined with each other unless specifically noted otherwise.

DETAILED DESCRIPTION OF EMBODIMENTS

Figure 1A:
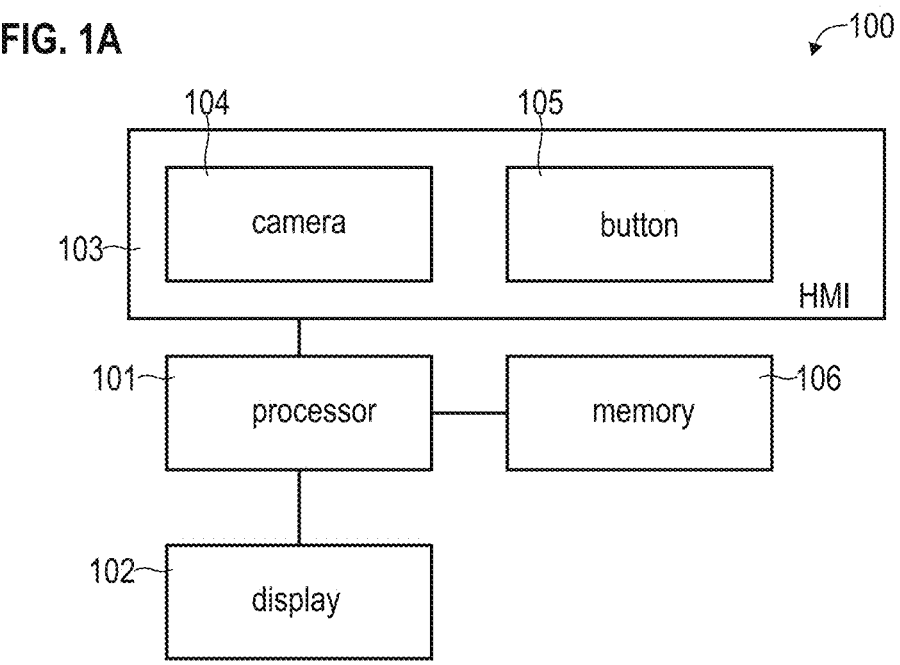
FIG. 1A schematically illustrates a device according to various examples, the device comprising a processor, a display, and the human machine interface (HMI).

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, various techniques with respect to employing an eye-tracking system are described. In some examples, the eye tracking may be employed in a vehicle such as a passenger car.

The techniques enable the user to activate menu items dynamically by selectively focusing different ones of the menu items with the eye. In various examples, the orientation of the eye gaze associated with the eyes of the user is detected or tracked. In detail, the orientation of the eye gaze with respect to menu items of a graphical user interface (GUI) may be detected.

A user action based on the orientation of the eye gaze can correspond to: the user is looking at a given point of the display, the eye-tracking system recognizes/calculates to coordinates and optionally the level of variance/inaccuracy of the visual focus and passes the data to a processor. Then, based on the orientation of the eye gaze, it can be decided whether a certain function should be activated.

The GUI may be depicted on one or more displays. E.g., the GUI may be depicted on a cluster instrument display of a vehicle, a center console display, an infotainment display, and/or a head-up display (HUD). Also, three dimensional displays, e.g. autostereoscopic displays, are conceivable.

Where a given menu item is activated, a corresponding function associated with the respective menu item may be activated or triggered. Activation of the function may comprise one or more of the following: triggering display of additional information, e.g., in a reserved area of the GUI and/or nearby the activated menu item using, e.g., a pop-up window. E.g., a function can be any audio-visual reactions such as a pop-up menu being displayed, a menu being browsed, etc. Additional information may also be displayed within the menu item, e.g., by changing its shape or form. Alternatively or additionally, a function can correspond to a non-visual reaction which changes the internal state of a vehicle component. In some examples, the function can correspond to logging the last coordinate of the orientation of the eye gaze. Activation of the function associated with a given menu item may also comprise changing one more operational parameters of the vehicle or of a vehicle component, e.g., a volume of an entertainment system, wiper speed, temperature of the air conditioning system, etc.

The techniques described herein may be applicable to driver and/or codriver control of a vehicle-based eye-tracking system. One or more cameras may define one or more fields of view which include the driver seating area and/or the codriver seating area. If the driver and codriver are enabled to operate the same physical display (e.g. of the infotainment system—usually a central display), then it may be desirable to provision a split view display, which offers e.g. two independent HMI for driver and codriver, e.g., separated by viewing angle. Alternatively or additionally, it may be possible to implement a "master/slave" logic to solve access conflicts between driver and codriver.

FIG. 1A illustrates aspects with respect to a device 100 according to various examples. The device 100 comprises a processor 101, a memory 106, and a display 102. The memory 106 may be non-volatile. The device 100 further comprises a HMI 103 comprising a camera 104 and a key-press button 105. Generally, the HMI 103 may comprise more than one camera 104 and/or may comprise more than one button 105. The HMI 103 may comprise elements such as: a touch screen, voice control, a keypad, and/or steering wheel buttons, etc.

Different mounting positions of the camera 104 are conceivable. One or more cameras 104 may be mounted below the instrument cluster, e.g., horizontally centered below the instrument cluster with 0 degree horizontal angle, shifted forward a towards the driver with a slightly higher vertical angularity (towards the face of an average size person) than the instrument cluster. The vertical angle of the camera could also be linked to the steering wheel adjustment. When presuming that a driver is responsible for setting up a reasonable steering wheel adjustment regarding ergonomics and a clear view on the instrument cluster, then possibly a static mounting position (regarding depth and vertical angle) is sufficient for covering a wide range of sizes of drivers. One or more cameras 104 may be mounted on the instrument cluster hood. Horizontally centered on the instrument cluster hood with 0 degree horizontal angle, possibly shifted backward towards the windshield with a suitable vertical angle (towards the face of an average size person). This mounting position could enable the eye-tracking system for use with head-up systems. One or more cameras 104 may be mounted near A-pillar (driver side). One or more cameras 104 may be centered on the dashboard. One or more cameras 104 may be mounted below the central display. Generally, any other position giving adequate performance/precision is available for mounting one or more cameras 104.

A suitable camera can be an infrared camera. Here, bright-pupil tracking can be used for reliable eye-tracking systems. By using infrared/near-infrared light as illumination source, and even more reliable eye tracking can be implemented. Also passive infrared cameras may be employed. The illumination source, if available, can be active whenever eye tracking is enabled, even during daytime. Available eye tracking solutions based on camera, control unit, and software may detect and adapt discreetly to changes in the lighting conditions. As infrared/near-infrared light is invisible for the human eye, it doesn't cause distraction.

Figure 1B:
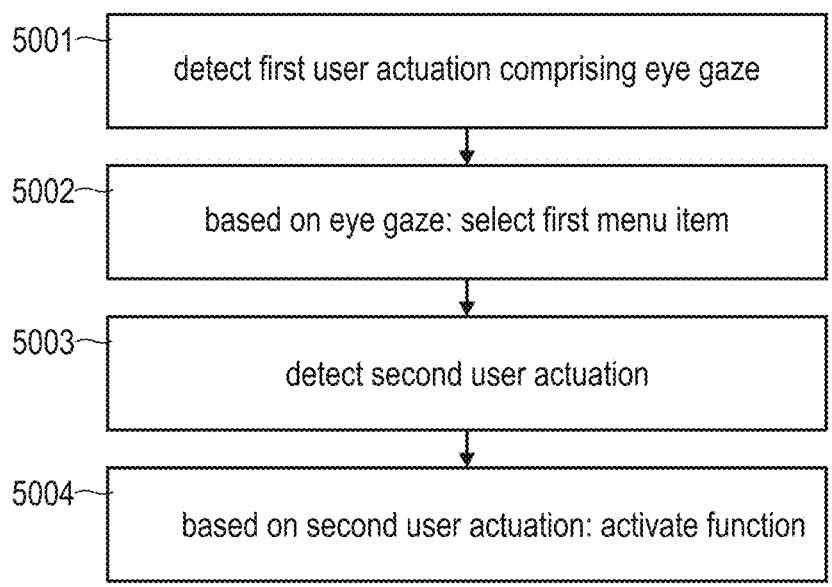
FIG. 1B is a flowchart of a method according to various examples.

The processor 101 of the device 100 is configured to implement techniques of eye tracking. E.g., the processor 101 may be configured to execute the method as illustrated by the flowchart of FIG. 1B.

First, a first user action is detected, 5001. The first user action comprises an eye gaze. E.g., for this the processor 101 may receive image data from the camera 104. The processor 101 may be configured to analyze the image data to detect the first user action comprising an eye gaze associated with the eyes of the user. Here, the processor may map the orientation of the eye gaze—e.g., a focal point of the eye gaze—with a position on the display and/or with a position in the GUI. Based on the structure of the GUI, it is then possible to determine one or more target menu items of the first user action.

Based on the orientation of the eye gaze, it is then possible at 5002 to select at least one first menu item. E.g., in a simple scenario, a menu item may be selected towards which the eye gaze is oriented. In another example, one or menu items may be selected which are positioned in the vicinity of the orientation of the eye gaze. E.g., all nearest-neighbor menu items may be selected. In other examples, menu items may be selected which will fill a certain geometric relationship with the orientation of the eye gaze. E.g., all menu items may be selected which are positioned on the display towards which the eye gaze is oriented.

Then, at 5003, a second user action is detected. The second user action may comprise a further eye gaze. E.g., the further eye gaze may fulfill a certain relationship with respect to the eye gaze of 5001: e.g., the further eye gaze may be oriented in the same manner as the eye gaze of 5001 or may be oriented differently. Alternatively or additionally, the second user action at 5003 may also comprise other elements, e.g.: a gesture, actuation of a button, such as a steering wheel button, etc.

Then, at 5004, based on the second user action, a function is activated. The function is associated with one of the menu items selected at 5002 and is further specified by the second user action.

Thus, based on the first and second user actions, a two-step activation process of the function can be implemented.

Figure 2:
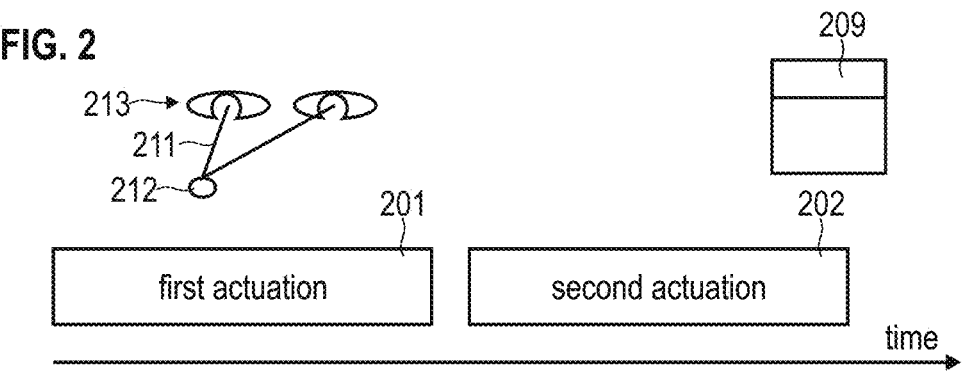
FIG. 2 schematically illustrates a first user action comprising an eye gaze associated with the eyes of the user and a second user action, wherein based on the second user action a function associated with a given one of at least one first menu item which is selected based on the orientation of the eye gaze is activated.

FIG. 2 illustrates aspects with respect to the first user action 201 and the second user action 202. As illustrated in FIG. 2, the first user action 201 comprises an eye gaze 211 associated with the eyes 213 of the user. The eye gaze 211 defines an orientation 212. E.g., the orientation 212 can be associated with a focal point of the eye gaze 211. While in FIG. 2 the eye gaze 211 is defined with respect to both eyes, in other examples the eye gaze 211 may be defined with respect to a single eye only.

The first user action 201 may be associated with a certain duration before at least one menu item is selected. E.g., the certain duration may be in the order of less than one second, preferably less than 500 milliseconds, more preferably less than 200 milliseconds. Thus, it may be required that the user persistently orientates the eye gaze 211 on a respective menu item for the given time duration before the latter is selected.

While the first user action 201 selects a subfraction of menu items from the plurality of available menu items of the GUI, it is only the second user action 202 which activates a function 209 of a given one of the selected menu items.

Based on such techniques, it is possible to implement the two-step process for activating the function 209 associated with a given one of menu items of a corresponding GUI. In particular, in a first step of the two-step process, based on the orientation 212 of the eye gaze 211 of the first user action 201, at least one first menu item is selected from the plurality of menu items of the GUI. Next, in the second step of the two-step process, based on the second user action 202, the function 209 associated with a given one of the at least one first menu item is activated.

By implementing such a two-step activation process, more defined activation of the function 209 is possible. In particular, unintentional activations of the function 209 by the user may be avoided. This may be due to not implementing activation of the function 209 solely based on the orientation 212 of the eye gaze 211 of the first user action 201: if the user is, e.g., seeking for certain information on the display, there is a chance that the user is simply looking around, thereby subsequently focusing different points on the GUI without the intention to activate associated functions. By introducing the second user action 202, unintentional activation of the function 209 is avoided in such a scenario.

Illustrated in FIG. 2 is a scenario where the first user action 201 and the second user action 202 are issued in one instance, e.g., in one context and within a certain temporal threshold. Thus, there may be a link between the first user action 201 and the second user action 202, e.g., a logical link, a temporal link, and/or a spatial link. In the example of FIG. 2, the second user action 202 is offset in time domain from the first user action 201. It is still possible that the second user action 202 is required to be issued within a threshold time with respect to the first user action 201 in order to ensure that the first user action 201 and the second user action 202 are issued in one instance. E.g., the second user action 202 may be required to be issued within 500 ms or 1 s or 2 s after the first user action 201.

Figure 3:
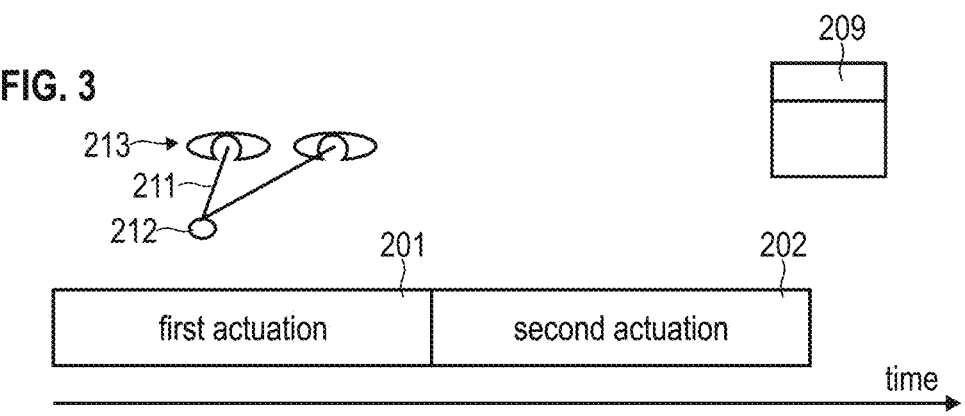
FIG. 3 schematically illustrates a first user action comprising an eye gaze associated with the eyes of the user and a second user action, wherein based on the second user action a function associated with a given one of at least one first menu item which is selected based on the orientation of the eye gaze is activated.

FIG. 3 illustrates aspects with respect to the first user action 201 and the second user action 202. FIG. 3 generally corresponds to FIG. 2. However, in the example of FIG. 3, the second user action 202 is arranged adjacent in time domain with respect to the first user action 201. Again, the first user action 201 and the second user action 202 are issued in one instance. Also in the scenario of FIG. 3, the second user action 202 begins after the beginning of the first user action 201.

The scenario of FIG. 3 imposes comparably strict requirements on the activation of the function. Thus, unintentional activation of the function may be effectively avoided.

Figure 4:
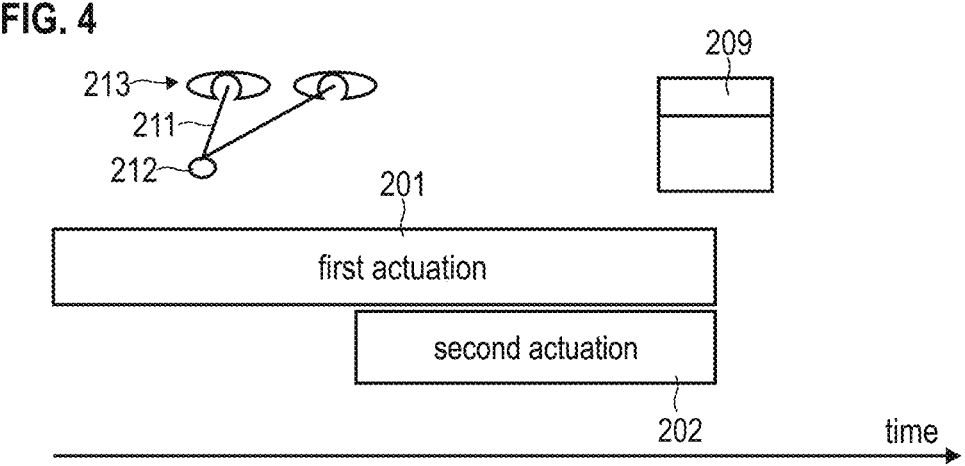
FIG. 4 schematically illustrates a first user action comprising an eye gaze associated with the eyes of the user and a second user action, wherein based on the second user action a function associated with a given one of at least one first menu item which is selected based on the orientation of the eye gaze is activated.

FIG. 4 illustrates aspects with respect to the first user action 201 and the second user action 202. FIG. 4 generally corresponds to FIG. 2. However, in the example of FIG. 4, the first user action 201 and the second user action 202 are partially overlapping in time domain. Hence, the first user action 201 is persistent during the second user action 202. While in the example of FIG. 4 the first user action 201 is persistent during the entire second user action 202, in other examples it is possible that the first user action 201 is only persistent during a first part of the second user action 202.

In the example of FIG. 4, it may be required that the user keeps the orientation 212 of the eye gaze 211 targeting a selected menu item, while the second user action 202 is issued. This may be possible by implementing the second user action 202 different from the first user action 201. E.g., the second user action 202 may correspond to a hand waving gesture, a voice command, etc. issued while the user is focusing the selected menu item. Because the user is required to keep the orientation 212 of the eye gaze 211 targeting the selected menu item—i.e., because the first user action 201 is persistent during at least a first part of the second user action 202—said activating of the function 209 is further based on the first user action.

By designing the first user action and the second user action 201, 202 to be overlapping in time domain, an even stricter criterion for issuing the actions 201, 202 in one instance may be defined. This may further avoid unintentional activation of the function 209.

In the examples described herein, selection of at least one menu item may be associated with a timeout. E.g., the at least one menu item may be deselected if the orientation 212 of the eye gaze 211 is not associated with the at least one menu item anymore, e.g., for a threshold time.

Figure 5:
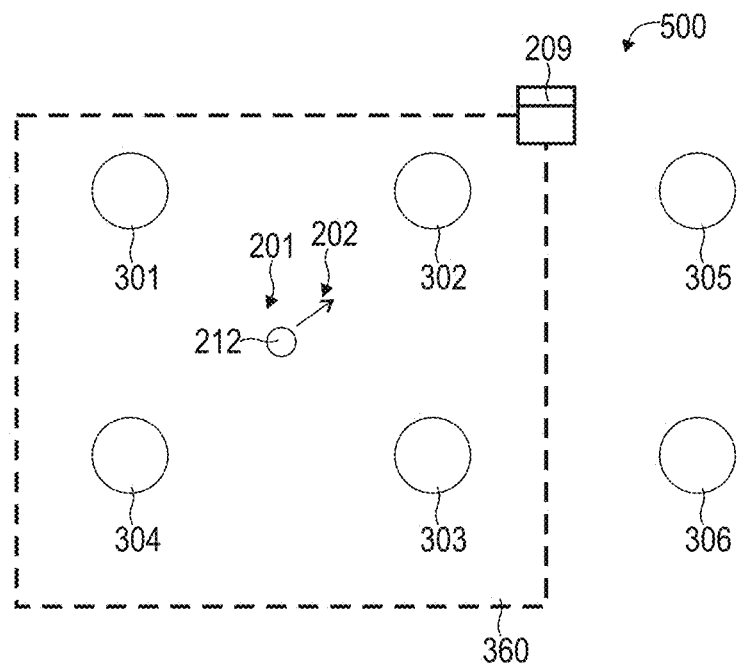
FIG. 5 schematically illustrates selecting the at least one first menu item from a plurality of menu items of a GUI based on the orientation of the eye gaze according to various examples.

FIG. 5 illustrates aspects with respect to the GUI 500. The GUI 500 of the example of FIG. 5 comprises the menu items 301-306. In general, the GUI 500 may comprise a smaller or larger number of menu items.

Illustrated in FIG. 5 is a scenario where the orientation 212 of the eye gaze 211 of the first user action 201 is oriented within an area 360 of a display in which the menu items 301-304 are positioned. Further, the menu items 305, 306 are positioned outside the area 360. Because the orientation 212 of the eye gaze 211 of the first user action 212 is situated within the area 360, the menu items 301-304 are selected from the plurality of menu items 301-306. The menu items 305, 306 are not selected.

E.g., in one example, only those menu items 301-304 are selected which are nearest-neighbors to the orientation 212 of the eye gaze 211. Hence, the area 360 could be defined with respect to the nearest-neighbors of the orientation 212 of the eye gaze 211. In further examples, the area 360 could comprise all menu items of the GUI 500 that are positioned on the same display on which the orientation 212 of the eye gaze 211 is targeted. Such a scenario corresponds to a rough pre-selection of all menu items position on a given display by means of the eye tracking; the subsequent fine-selection then decides which particular function of the menu items on the display to activate. Thus, it is also conceivable that the eye-tracking system detects on which of the displays the user is currently looking by the first user action. Then, the eye-tracking system could enable the user to operate the corresponding display further by the second user action, comprising, e.g.: eye tracking and/or actuation of one or more steering wheel buttons. E.g. when the user is looking on the infotainment display, it could be possible to operate the cursor (from current position) by the steering wheel buttons ("up"/"down"/"left"/"right"/"ok"), so the user wouldn't have to take the hands off the wheel to operate the infotainment system by a reference input method, e.g., 4-way controller. This could be a low-cost variant of the eye-tracking system without a need for high precision eye tracking. Here, the viewing direction has to be detected at a comparably low accuracy. This may be implemented based on a single camera; other detection system may not be required. Such a low-accuracy eye tracking could also be an add-on to high precision eye tracking, providing an extra interaction method for the user. Such a scenario allows to implement the eye tracking at a comparably low complexity. This may reduce hardware demands and thereby save costs. Also, it allows fast and simple selection of a given display from a plurality of displays.

In some examples, selecting one or more menu items may be indicated to the user. E.g., referring again to the scenario of FIG. 5, in response to selecting the menu items 301-304, the menu items 301-304 may be highlighted, i.e., made particularly visible within the GUI 500. E.g., the selected menu items 301-304 may be highlighted if compared to non-selected menu items 305, 306.

Highlighting the menu items 301-304 may comprise different actions, e.g.: hovering a cursor symbol above the menu items 301-304; changing a blur of the menu items 301-304 or a background of the menu items 301-304; changing a size of the menu items 301-304; changing a geometric shape of the menu items 301-304; changing an information content of the menu items 301-304; and changing the color of the menu items 301-304. Such techniques may be combined with each other or further techniques in various examples.

In further examples, such selecting may not be indicated to the user. E.g., it is possible that the selecting of menu items is an internal process of the processor 101 used to narrow down the search space for subsequently activatable functions associated with the selected menu items 301-304. Hence, in other words, it is possible that the user is not immediately informed about selection of at least one menu item, but such processing is rather used in order to make the subsequence activation of an associated function more reliable.

In the example of FIG. 5, the second user action 202 corresponds to selection of one of the menu items 301-304: in the example of FIG. 5, the menu item 302 is selected by the second user action 202 from the menu items 301-304. Because of this, the function 209 associated with the menu item 302 is activated.

Generally, the second user action 202 may vary depending on the implementation. In some examples, it is possible that also the second user action 202 involves techniques of eye tracking. E.g., it is possible that the second user action 202 comprises a further eye gaze associated with the eyes of the user. The further eye gaze may have the same or different orientation as the eye gaze of the first user action. It is also possible that the second user action 202 involves techniques other than eye tracking, e.g., one or more of the following: a hand gesture of the user; a finger gesture of the user; a button press; an eyebrow raise of the user; a wink of the user; etc.

By such techniques it becomes possible to combine the eye-tracking system with a gesture tracking system. So the user would be enabled to further control/operate a currently selected menu item by one or more gestures implementing the second user action. E.g. when the user is focusing a volume menu item (which is thereby selected), the loudness could be increased/decreased by a gesture (implementing the second user action).

Figure 6A:
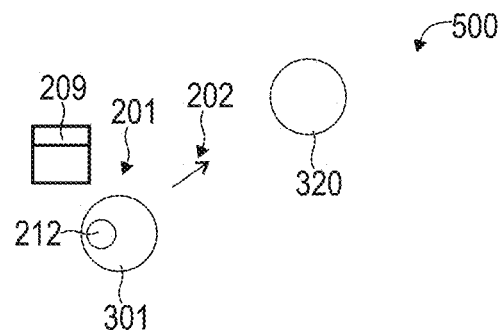
FIG. 6A schematically illustrates selecting the at least one first menu item from a plurality of menu items of a GUI based on the orientation of the eye gaze according to various examples.

FIG. 6A illustrates aspects with respect to the GUI 500. The GUI 500 of the example of FIG. 6A comprises two menu items 301, 320.

In the example of FIG. 6A, the orientation 212 of the eye gaze 211 targets the menu item 301. Due to this, the menu item 301 in the example of FIG. 6A is selected. In response to selecting the menu item 301, the visibility of the further menu item 320 is activated. Until the menu item 301 is selected, the further menu item 320 is not visible in the GUI 500.

Then, the second user action 202 is associated with the further menu item 320. E.g., the second user action 202 may comprise moving a cursor towards the further menu item 320. In the example of FIG. 6A it could be possible that also the second user action 202 comprises a further eye gaze. The further eye gaze could confirm activation of a function associated with the menu item 301 if the orientation 212 of the further eye gaze targets the further menu item 320. Also, a hand gesture towards the menu item 301 may be possible.

By activating the visibility of the further menu item 320, it is possible to unambiguously request confirmation from the user whether activation of the function 209 associated with the menu item 301 is indeed intended.

While in the example of FIG. 6A initially the menu item 201 is visible, the function 209 of which is subsequently activated, in other examples, it would also be possible that the visibility of the menu item the function of which is subsequently activated is only activated in response to the eye gaze targeting a further menu item. Such a scenario is illustrated in FIG. 6B.

Figure 6B:
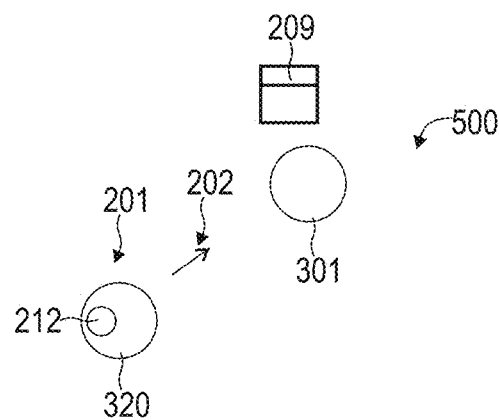
FIG. 6B schematically illustrates selecting the at least one first menu item from a plurality of menu items of a GUI based on the orientation of the eye gaze according to various examples.

FIG. 6B illustrates aspects with respect to the GUI 500. The GUI 500 again comprises two menu items 301, 320. In the example of FIG. 6B, the orientation of the eye gaze 211 targets the further menu item 320 which is different from the menu item 301. Only the further menu item 320 is initially visible. Nonetheless, the menu item 301 is selected based on the orientation 212 of the eye gaze 211 of the first user action 201 being directed towards the further menu item 320. In response to selecting the menu item 301, the visibility of the menu item 301 is activated. The second user action 202 then activates the function 209 associated with the menu item 301.

Figure 7:
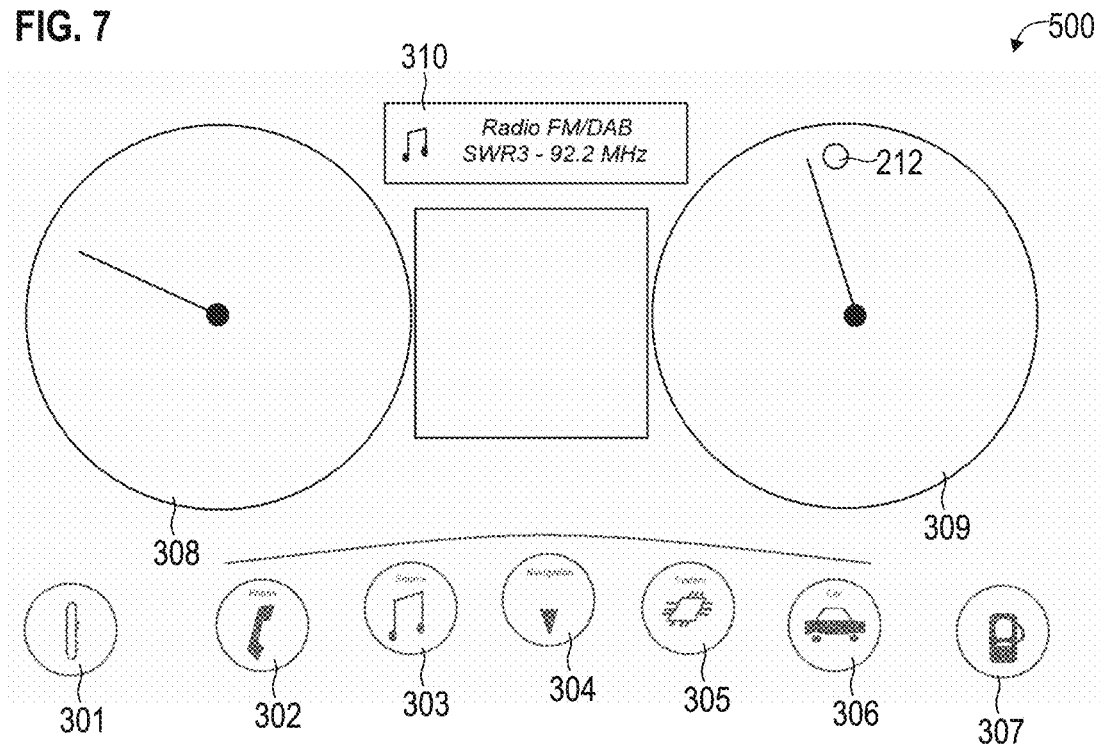
FIG. 7 schematically illustrates eye tracking techniques for an example GUI, wherein selected menu items are highlighted by optically damping other menu items.

FIG. 7 illustrates aspects with respect to the GUI 500. The GUI 500 of the example of FIG. 7 comprises a plurality of menu items 301-310. In the example of FIG. 7, the orientation 212 of the eye gaze 211 targets the menu item 309.

Because of this, the menu item 309 is selected. Selection of the menu item 309 causes highlighting of the menu item 309 if compared to the menu items 301-308, 310. In the example implementation of FIG. 7, such highlighting of the menu item 309 is achieved by optically damping the menu items 301-308, 310. This may be achieved by reducing a contrast level for the menu items 301-308, 310.

Figure 8:
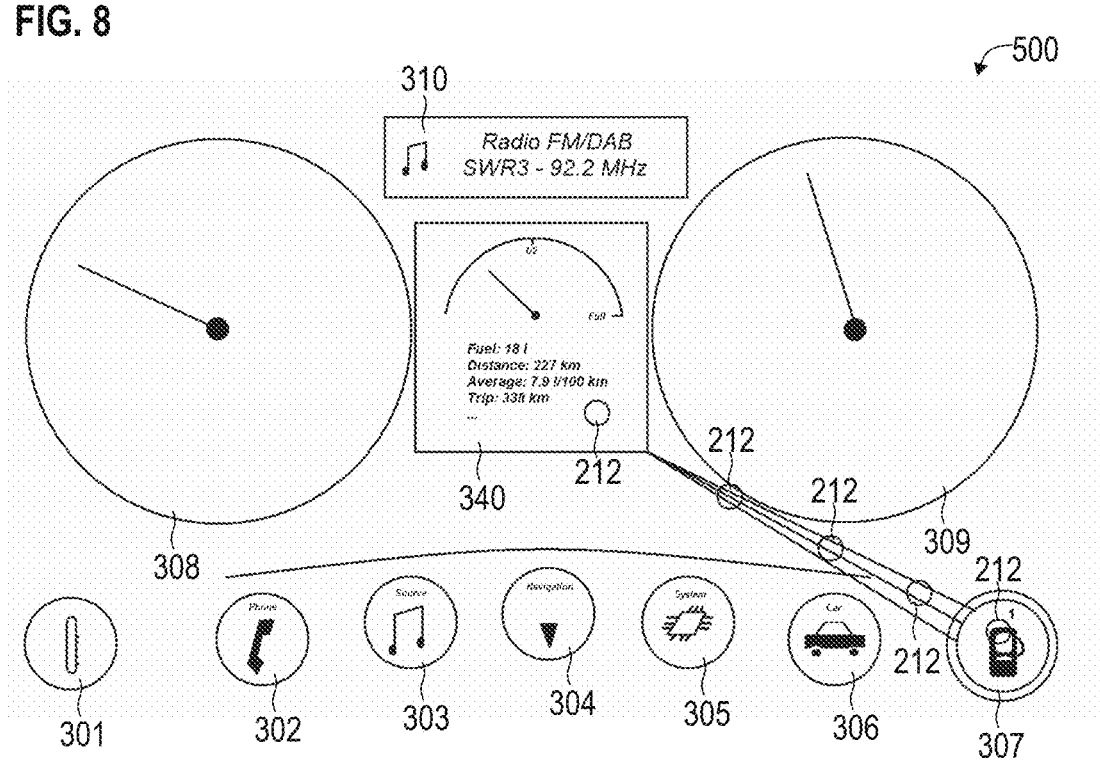
FIG. 8 schematically illustrates eye tracking techniques for an example GUI, wherein tooltip information is depicted for a selected menu item.

FIG. 8 illustrates aspects with respect to the GUI 500. The GUI 500 of FIG. 8 corresponds substantially to the GUI 500 of the example of FIG. 7. In the scenario of FIG. 8, the orientation 212 of the eye gaze 211 is initially positioned within the extents of the menu item 307 (gas item in the example of FIG. 8). Because of this, the menu item 307 is selected. Selection of the menu item 307 triggers depicting of tooltip information 340. The tooltip information 340 is associated with the menu item 307. The tooltip information 340 is depicted in the reserved center area of the corresponding display. Thus, the tooltip information 340 is depicted offset from the position of the menu item 307. In other examples, it would also be possible to depict the tooltip information 340 at the position of the menu item 307 which has been selected.

It is possible to have some kind of smooth animation between the selected menu item 307 and the area in which the tooltip information 340 is depicted. Such animation may guide the orientation 212 of the eye gaze 211 on a short path to the area in which the tooltip information 340 is depicted (as indicated by the various positions of the orientation 212 in FIG. 8). In such a scenario, the user can decide whether to follow the path or focus on another menu item or not focus on the display. If the user follows the path and focuses on the tooltip information 340—thereby executing the second user action 202 implementing a further eye gaze—a respective function may be triggered.

The center area may depict tooltip information regarding the last-selected menu item 301-309. Optionally, a timeout—e.g., 3 seconds—may be provided; the timer may be initiated when the orientation 212 leaves the center area. Afterwards, information depicted in the center area may fall back to a configurable default information or simply remain empty/transparent.

Figure 9:
FIG. 9 schematically illustrates eye tracking techniques for an example GUI, wherein menu items are highlighted by blur and unblur effects.
Figure 10:
FIG. 10 schematically illustrates eye tracking techniques for an example GUI, wherein menu items are highlighted by blur and unblur effects.

FIGS. 9 and 10 illustrate blur and unblur effects used for highlighting menu items 308, 309, 310, respectively. In FIG. 9, the orientation 212 of the eye gaze 211 targets the menu item 309. Because of this, the menu items 308, 309 are selected. The non-selected menu item 316 (corresponding, in the example of FIGS. 9 and 10, to a background map) is blurred. This avoids distraction of the user. The cognitive load is lowered.

A corresponding situation is illustrated in FIG. 10; however, in FIG. 10, the orientation 212 of the eye gaze 211 is positioned with respect to the menu item 316. Here, the menu items 308, 309 are blurred and the menu item 316 is unblurred.

Thus, in the context of the blur/unblur effect, a selective highlighting of the menu items 308, 309, 316 depending on the selection based on the orientation 212 of the eye gaze 211 can be achieved.

Blur and unblur effects could, alternatively or additionally, be used in order to visually distinguish between selectable and non-selectable elements. E.g., those elements could be non-selectable which do not offer an associated function 209.

Figure 11:
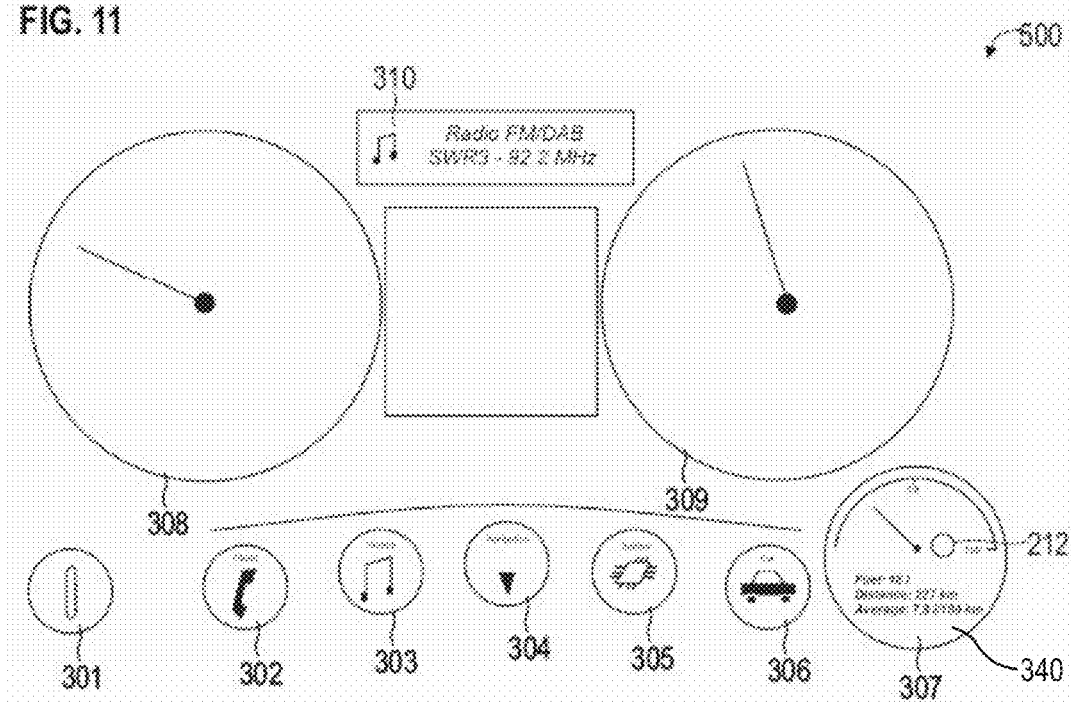
FIG. 11 schematically illustrates eye tracking techniques for an example GUI, wherein a selected menu item is highlighted by changing its shape and information content.

FIG. 11 illustrates changing of the size and shape of a selected menu item 307 for highlighting. In the example of FIG. 11, the orientation 212 of the eye gaze 211 targets the menu item 307. In response to the selection of the menu item 307, the menu item 307 is increased in size (cf. FIG. 7). Additional tooltip information 340 is depicted at the position of the menu item 307.

By depicting the tooltip information at the position of the selected menu item 307, driver distraction can be avoided. In particular, re-focusing of the eye can be avoided, because the tooltip information is provided at the position of the eye focus.

Figure 12:
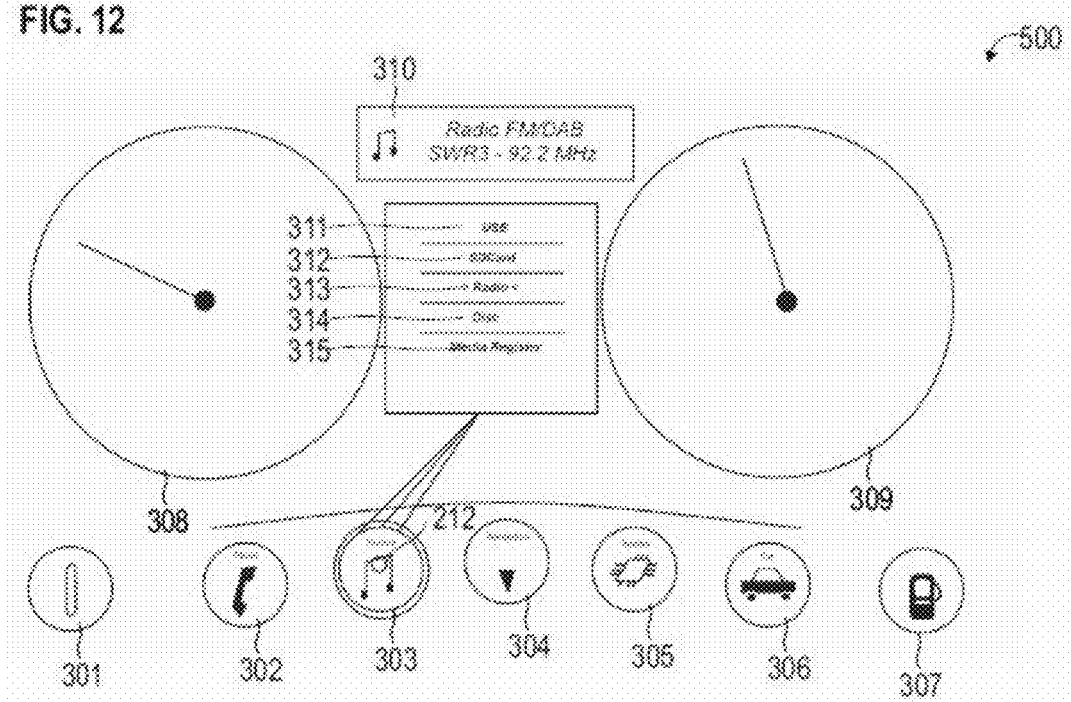
FIG. 12 schematically illustrates eye tracking techniques for an example GUI, wherein a selected menu item is highlighted by changing a visibility of a plurality of further menu items.

FIG. 12 illustrates aspects with respect to the GUI 500. Here, menu items 311-315 are selected by orienting the eye gaze 211 such that it targets the further menu item 303. Selecting the menu items 311-315 corresponds to activating the visibility of the menu items 311-315 in the center region of the display. It is then possible to activate a function associated with one of the menu items 311-315 based on the second user action 202.

Figure 13:
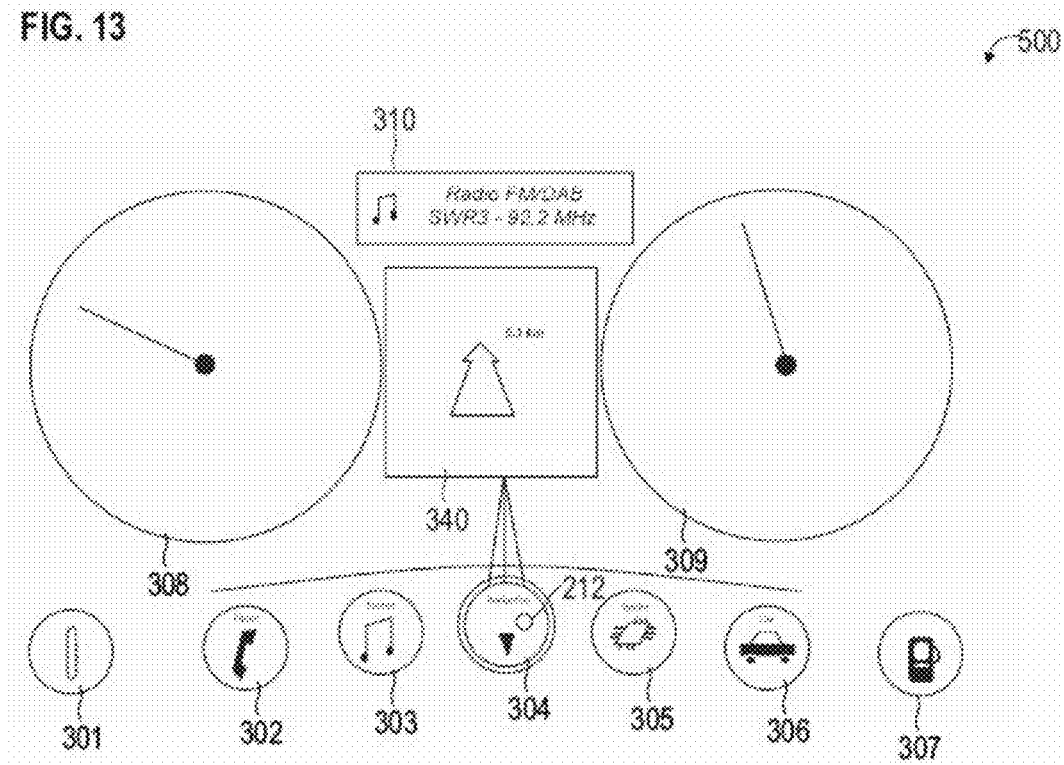
FIG. 13 schematically illustrates eye tracking techniques for an example GUI, wherein tooltip information is depicted for a selected menu item.

FIG. 13 illustrates aspects with respect to the GUI 500. The menu item 304 is selected by orienting the eye gaze 212 accordingly. This triggers depicting of tooltip information 340 in the center region. In the example of FIG. 13, the tooltip information 340 corresponds to arrow-based route guidance or a small map having a is indicating the position of the car.

Figure 14:
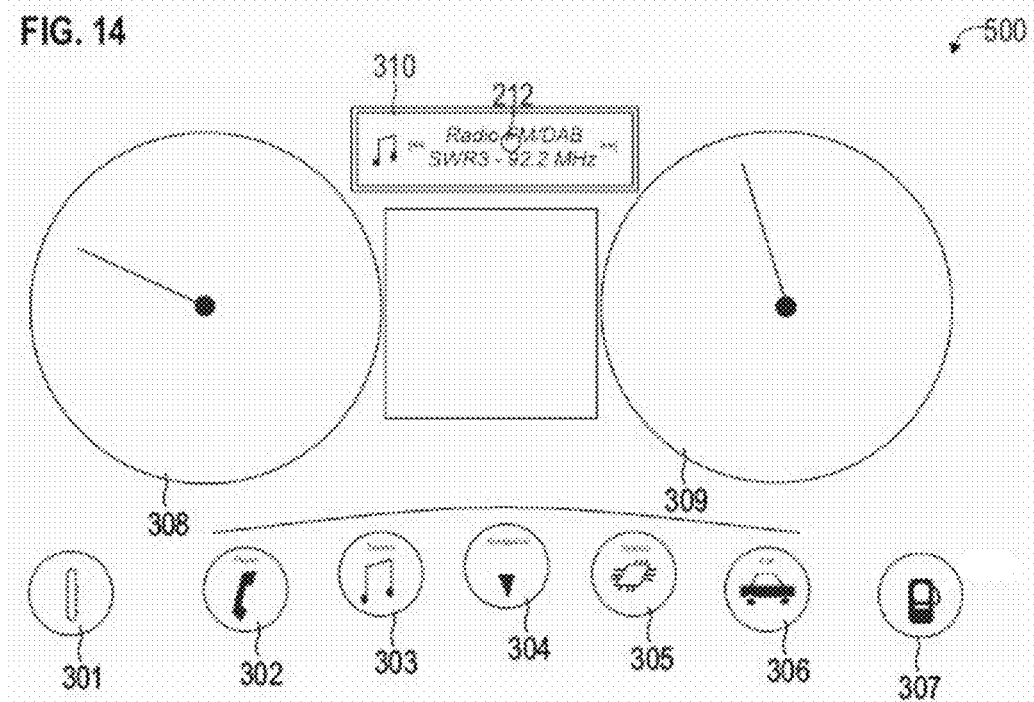
FIG. 14 schematically illustrates eye tracking techniques for an example GUI.

FIG. 14 illustrates aspects with respect to the GUI 500. Here, the eye gaze 211 has an orientation 212 targeting menu item 310. The menu item 310 is then selected. In the example of FIG. 14, this selection is not graphically indicated to the user.

The selected menu item 310 can then be operated further as part of the second user action. For the second user action, it would be possible to employ steering wheel buttons or the like. Some items like current station, current track, skip icons, etc., can be faded in/out dynamically depending on whether the menu item 310 is selected or not selected.

Figure 15:
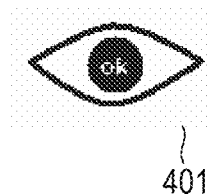
FIG. 15 illustrates icons associated with the eye tracking.
Figure 15:
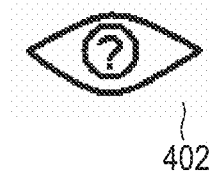
Figure 15:
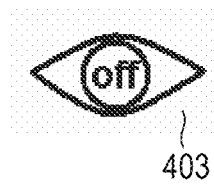
Figure 15:
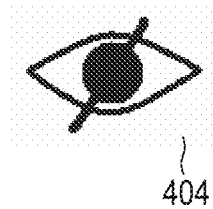

There could be a range of icons which indicate the current state of the eye tracking functionality. FIG. 15 illustrates different icons 401-404 which correspond to different states of the eye-tracking system. The icon 401 illustrates that the eye tracking functionality is active and the eye gaze 211 of the users recognized. The icon 402 illustrates that the eye-tracking system is active, but currently the eye gaze 211 of the user is not recognized, for whatever reason. The icon 403 illustrates that the eye tracking functionality is available, i.e., calibration data for the current user is available, but the eye-tracking system currently is switched off, e.g., by the user. The icon 404 illustrates that the eye tracking functionality is not available for whatever reason, e.g., missing calibration data, camera failure, etc.

It is possible that eye tracking techniques are based on a single eye or two eyes for recognition. E.g., during a calibration process, it is possible to select one of the two available eyes and determine which eye gives the best performance and should be used for the eye tracking. Sometimes, the availability of eye tracking may correlate with calibration being performed for each user. Here, eye tracking may be disabled when the current user has not performed calibration. Hence, in other words: if calibration data for the current user is not available in the database, the eye tracking may be disabled. Here, automatic person recognition may be employed in order to uniquely identify a person. Such person identification may be done by a camera of the eye-tracking system, e.g., using/scanning biometric data of the face; and/or by any other camera or appropriate system. If an unrecognized person is detected, eye tracking could be required to be enabled manually. For this purpose, e.g., a popup window on the instrument cluster infotainment display could be displayed, asking the user for performing a calibration process. If calibration is not successful, the eye tracking would be enabled. If the user denies the request for calibration, the eye tracking functionality may remain disabled. Malfunction of the system can thereby be prevented.

Such calibration of the eye tracking is particularly important with respect to the first user action 201 which comprises the eye gaze 211. However, in some examples, the calibration may also relate to aspects of the second user action 202 which may also comprise a further eye gaze and/or an eyebrow raise.

Figure 16:
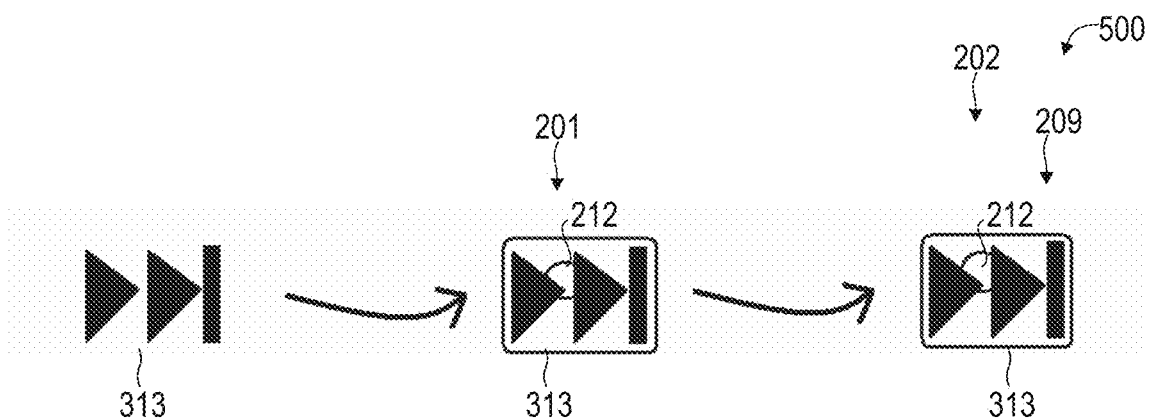
FIG. 16 illustrates schematically a two-step activation of a function based on a first user action and a second user action according to various examples, wherein the second user action comprises a further eye gaze.

FIG. 16 illustrates aspects with respect to the GUI 500. In particular, FIG. 16 illustrates a two-step activation process of a function 209. In FIG. 16, a given menu item 313 of the GUI 500 is illustrated ("skip item"). The associated function 2009 is to skip the next track of audio playback.

First, the eye gaze 211 is not oriented with respect to the menu item 313 (left side of FIG. 16). Thus, the first user action 201 has not yet taken place and the menu item 313 is not selected.

Then, the first user action 201 takes place in the menu item 313 is selected (FIG. 16, middle part). In the example of FIG. 16, the first user action 201 comprises positioning the orientation 212 of the eye gaze 211 on the menu item 313. Selecting of the menu item 313 in the example of FIG. 16 may comprise: highlighting the menu item 313. E.g., highlighting of the menu item 313 in the example of FIG. 16 comprises drawing a graphical border around the menu item 313 and/or changing its colour. By means of the highlighting, visual feedback regarding the selection of the menu item 313 is provided. This helps the user to understand that activation of the function 209 is now possible.

Next, the second user action 202 takes place and the function 209 associated with the menu item 313 is activated. In the example of FIG. 16, the second user action 202 may comprise a further eye gaze having the same orientation 212 as the eye gaze of the first user action 201; i.e., the second user action 202 may correspond to a continued eye gaze. Thus, by focusing the menu item 313 for a certain time duration, the activation of the function 209 is obtained.

Other examples of the second user action 202 may comprise a wink, a double-wink, a hand gesture, a voice command, e.g., "confirm", etc. E.g., it may be required that during such a second user action 209 the first user action 201 is persistent, i.e., that the user continues to focus the menu item 313. Then, said activating of the function 209 may be further based on the orientation of the eye gaze 211 of the first user action 201.

While in the example of FIG. 16, the activation of the function 209 has been described with respect to the skip forward icon 313, such a concept may be broadly applied to different kinds and types of menu items. Further menu items could include a point-of-interest icon in the map view, etc. Here, the function could be retrieval of background information which may be displayed in a pop-up window or as tooltip information.

Figure 17:
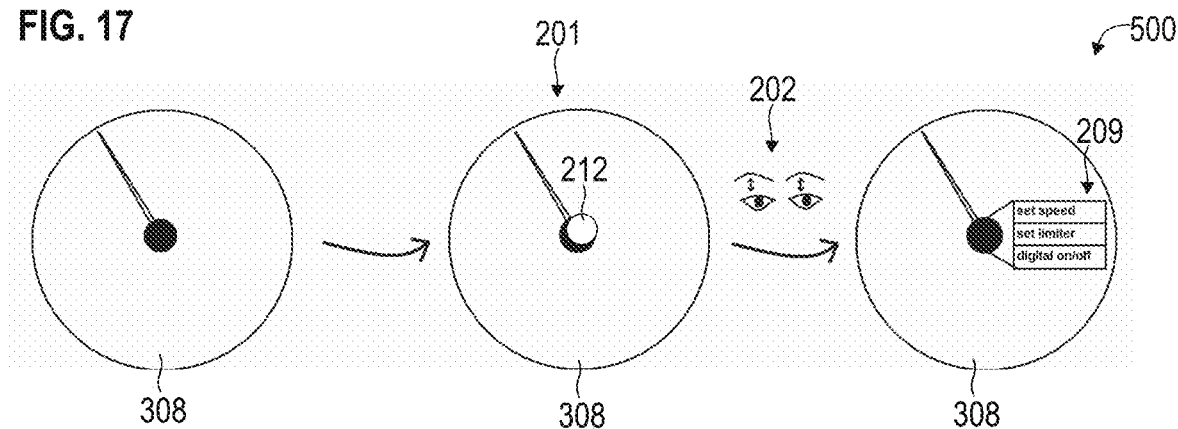
FIG. 17 illustrates schematically a two-step activation of a function based on a first user action and a second user action according to various examples, wherein the second user action comprises an eyebrow raise.

FIG. 17 illustrates aspects with respect to the GUI 500. Here, the two-step activation process of the function 209 is illustrated with respect to the menu item 308. Again, the first user action 201 comprises the orientation 212 of the eye gaze 211 being positioned with respect to the menu item 308. Then, the menu item 308 is selected. Selection of the menu item 308 may comprise change of color and indication of further available functions 209.

The second user action 202 comprises an eyebrow raise of the user. The eyebrow raise triggers execution of the function 209 which is associated with the menu item 308 selected by the first user action 201. In the example of FIG. 17, the function 209 corresponds to entering a submenu or a function being switched on/off, etc. E.g., the submenu may be browsed by further user actions.

Figure 18:
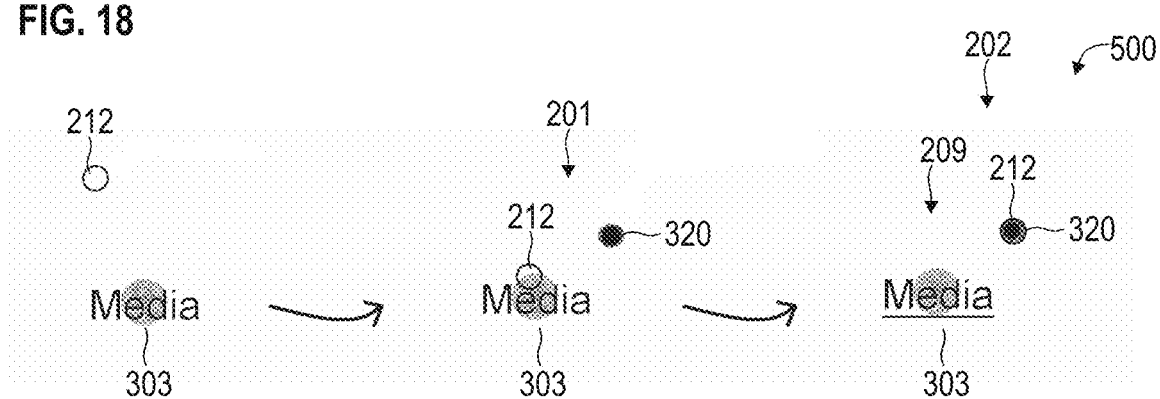
FIG. 18 illustrates schematically a two-step activation of a function based on a first user action and a second user action according to various examples, wherein the second user action comprises a further eye gaze with respect to a further menu item visible in response to selecting a first menu item.

FIG. 18 illustrates aspects with respect to the GUI 500. In detail, FIG. 18 illustrates aspects with respect to the second user action 202. In the example of FIG. 18, the second user action 202 comprises focusing a further eye gaze on a further menu item 320 for confirmation. In detail, as illustrated in FIG. 18, the menu item 303 is selected by orienting the eye gaze 211 correspondingly. Even if the menu item 303 is selected, the corresponding function 209 does not trigger automatically. This is to prevent accidental activation of the function 209.

Once the menu item 303 is selected, the further menu item 320 becomes visible. Such activating of the visibility of the menu item 320 may comprise effects such as: fade in, blurring, unblurring, etc. An animation may be provided.

In the example of FIG. 18, the further menu item 320 is a small graphical button positioned offset from the menu item 303. The second user action 209 may then be associated with the further menu item 320. E.g., the second user action 209 may comprise a further eye gaze targeting the further menu item 320. E.g., the second user action 209 may comprise a hand wave from lower-left to upper-right, i.e., corresponding to the offset of the menu item 303 and the further menu item 320.

Figure 19:
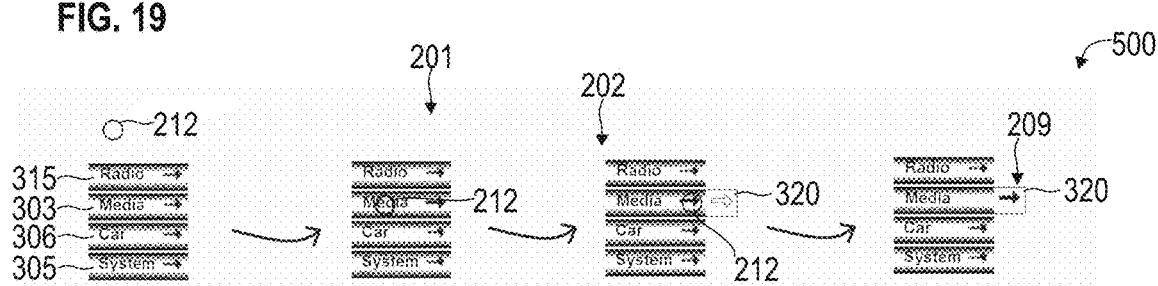
FIG. 19 illustrates schematically a two-step activation of a function based on a first user action and a second user action according to various examples, wherein the second user action comprises a further eye gaze with respect to a further menu item visible in response to selecting a first menu item.

In other examples, the further menu item 320 may comprise an icon such as an arrow, a target, circle, etc. to visually indicate its functionality of activating the function 209. This is illustrated in FIG. 19. In FIG. 19, when the orientation 212 of the eye gaze 211 is placed on the further menu item 320 in the form of the arrow icon, the second user action 202 is eventually performed. This triggers activation of a function, e.g., in the example of FIG. 19, activation of the media application or media submenu.

If a further eye gaze implementing the second user action 202 is then oriented with respect to the further menu item 320 for a certain time period, an associated function 209 of the menu item 303 is activated.

Figure 20:
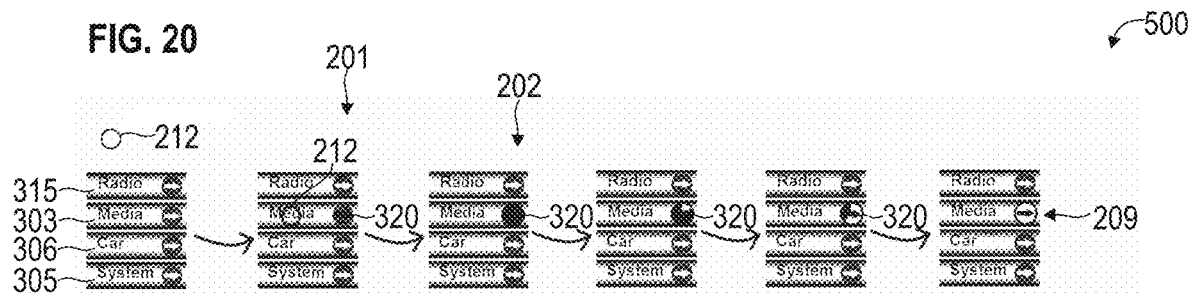
FIG. 20 illustrates schematically a two-step activation of a function based on a first user action and a second user action according to various examples, wherein the second user action comprises a further eye gaze with respect to an animated further menu item visible in response to selecting a first menu item.

E.g., the further menu item 320 may feature an animation which indicates to the user that the function 209 is about to be activated if the further menu item 320 is constantly focused by means of the further eye gaze and if its timeout is reached. The animation may be interactive, i.e., depend on the timer parameter. Such a scenario is illustrated in FIG. 20. Here, the further menu item 320 comprises an animation indicative of the progress of the second user action 202.

In one example, the animation can be a simple activity indication unrelated to the specific timeout of the menu item 303. It is also possible that the animation visually represents the progress of the timeout so that the user can anticipate when the function 209 is activated. E.g., in the example of FIG. 20, if the user puts the orientation 212 of the eye gaze 211 on the further menu item 320 implemented by the arrow icon, the animation starts and runs as long as the users focusing the arrow icon in a certain range and until the function 209 is triggered. If the user stops focusing the arrow icon 320 before the animation is completed, the animation could drop back—e.g., softly—to its initial state. Then, the function 209 would not be executed. Typical timeouts can be dimensioned in the order of one second, two seconds, etc., to give the user chance to abort the second user action 202/the confirmation process.

Figure 21:
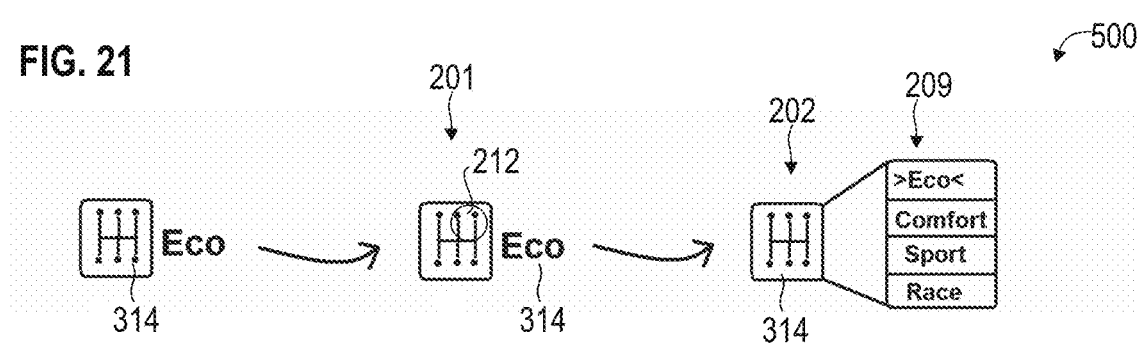
FIG. 21 illustrates schematically a two-step activation of a function based on a first user action and a second user action according to various examples, wherein the second user action comprises a further eye gaze.

While above various examples have been described with respect to the second user action comprising a further eye gaze, in other examples, other interactions with the user can be implemented. E.g., the second user action 202 may comprise activation of one or more steering wheel buttons. Such a scenario is illustrated in FIG. 21. Here, if the user targets the menu item 314 with the eye gaze 211 (gearbox icon on the instrument cluster, in the example of FIG. 21) and then presses "OK" on steering wheel, the function 209 is activated. Activation of the function 209 corresponds to activation of an option menu with the user can switch through the gearbox setting ("eco-, eco forward, sport, race", etc.) by further user actions, e.g., implemented based on steer wheel buttons such as up and down buttons. Such menus and application screens can have "back" softkeys to browse backwards (so browsing backwards is not an issue with eye tracking). Menus/submenus and application screens can have timeouts. Menus/submenus could be closed or browsed further by steering wheel buttons.

Summarizing, above two-step activation processes have been described comprising a first user action and a subsequent second user action. Here, at least, the first user action comprises an eye gaze.

Such techniques are based on the finding that eye-tracking systems are associated with some inaccuracies. E.g., the eye-tracking system may not be able to distinguish whether a user is looking at a menu item accidentally or just intends to obtain an overview of the HMI items or is looking for triggering any kind of function (pop-up information, setting focus, selecting and operating items, etc.).

To solve this problem, the techniques described herein offer unambiguous confirmation of the intent to activate a function by means of the two-step activation process. Depending on the implementation, the second user action may implement different interaction levels and safeguard them. The highest reliabilityiunambiguity is typically given by implementing the second user action to comprise manually pressing a button, e.g., an "OK" button on the steering wheel. Lower reliability can be achieved by implementing the second user action to comprise eyebrow detection and focusing a newly appearing further menu item.

By such a two-step activation process, various effects may be achieved. It may be possible to interact intuitively with the whole HMI: The user can start interaction with an item by simply looking at it (first user action). Then, generally, interaction with all visible items of the HMI is possible. Interaction is also possible with any "empty" area of the screen: e.g. a spotlight-effect can be linked to the recognized orientation of the eye gaze of the user or a pop-up (e.g. with speed information) or a pop-up menu (e.g., with selectable items) can be displayed with an offset to the (recognized) focus/gaze of the user.

By contrast the established input/interaction methods for instrument clusters, infotainment systems etc. offer only limited access and less intuitive interaction with the HMI: Interaction may be more abstract due to the usage of 4-way controllers (e.g. on steering wheel) or turn and press controllers (e.g. for infotainment systems). Scrolling of the HMI focus may be bound to more static paths with typical input methods. Typically, not all of the visible items of an HMI can be accessed directly. This is often determined by design/specification of the system to prevent, e.g., counter-intuitive operation paths or operation paths with too many steps.

Based on the techniques described herein, the eye-tracking operated system can give direct access to interesting information or often used functions: e.g. cruising range with current fuel can be retrieved e.g. by looking at a gas icon. This provides a time advantage for the user and requires less concentration than the traditional way, where the user typically operates the on-board vehicle computer with the steering wheel buttons and has to conceive a path depending on current menu position and has to press buttons several times to reach e.g. the trip menu. When operating the infotainment system (central display) by eye tracking, the user does not need to take hands off the steering wheel.

Summarizing, above techniques of using an eye-tracking system in an automotive environment, e.g., car, have been described. The techniques enable operating an instrument cluster, infotainment system/display, head-up system/display, etc. In some examples, it is possible to link user identification data with user specific calibration data and enabling/disabling the eye tracking function depending on the availability of calibration data and user recognition. Further, a status indication of the eye-tracking system/function may be available, e.g., by a range of icons. Such icons may be available on only some or on each eye-tracking controllable display. Tooltip information may be triggered by focusing a menu item using an eye gaze. The HMI focus may be set to a given menu item by focusing an eye gaze on it, i.e., by looking at it; the menu item may be selected. A function associated with a menu item may be activated by focusing the respective menu item for a certain time period, and/or by an eyebrow raise, and/or by focusing dynamic confirmation elements, and/or by using hardkeys such as steering wheel buttons. Such options may implement a second user action. Examples have been described which enable operating the eye-focused display (e.g., Instrument Cluster, Central display, Head-up display) by the steering wheel buttons (e.g. a 4-way controller). Also, using blur/ unblur effects for distinguishing focusable and not focusable elements or using blur effects, visual distraction may be reduced. It is possible to use eye tracking interaction for codriver. Eye tracking and gesture tracking may be combined.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

E.g., while certain examples of the GUI have been illustrated, these are non-limiting. Implementations of the GUI may differ, e.g., in terms of appearance, arrangement, and/or logical structure.

The invention claimed is:

1. A method carried out in a processor configured to execute program code stored in a non-volatile memory of the processor, the method comprising the steps of:
   displaying a graphical user interface comprising a plurality of menu items, wherein the graphical user interface is displayed on a plurality of displays;
   detecting a first user action comprising an eye gaze associated with the eyes of a user on a given one of the plurality of displays;
   based on the orientation of the eye gaze of the first user action, selecting at least one first menu item from the plurality of menu items wherein selecting at least one first menu item based on the orientation of the eye gaze takes place with respect to any position on a given one of the plurality of displays, the given one of the plurality of displays having the at least one first menu item;
   detecting a second user action at another display in the plurality of displays other than the given display; and
   based on the second user action, activating a function associated with a given one of the at least one first menu item.

2. The method of claim 1, further comprising:
   the first user action and the second user action are issued in one instance; and
   the second user action begins after the beginning of the first user action.

3. The method of claim 2, wherein the first user action is persistent during at least a first part of the second user action.

4. The method of claim 1, wherein the step of activating the function further comprises activating the function based on the orientation of the eye gaze of the first user action.

5. The method of claim 1, further comprising:
   the orientation of the eye gaze targets a further menu item different from the at least one first menu item; and
   in response to selecting the at least one first menu item, activating a visibility of the at least one first menu item.

6. The method of claim 1, further comprising:
   the orientation of the eye gaze targets the at least one first menu item; and
   in response to selecting the at least one first menu item, highlighting the at least one menu item.

7. The method of claim 6, wherein the step of highlighting the at least one menu item further comprises at least one of the following steps:
   hovering a cursor symbol above the at least one menu item;
   changing a blur of the at least one menu item;
   changing a background of the at least one menu item;
   changing a size of the at least one menu item;
   changing a geometric shape of the at least one menu item;
   changing an information content of the at least one menu item; and
   changing a color of the at least one menu item.

8. The method of claim 1, further comprising the step of:
   in response to selecting the at least one first menu item, depicting tooltip information related to the function associated with the at least one menu item.

9. The method of claim 8, further comprising:
   the orientation of the eye gaze targets the at least one first menu item; and
   the tooltip information is depicted at the position of the at least one menu item.

10. The method of claim 1, further comprising the steps of:
    in response to selecting the at least one first menu item, activating visibility of a further menu item different from the at least one first menu item; and
    the second user action is associated with the further menu item.

11. The method of claim 1, wherein the second user action further comprises at least one of the following:
    a hand gesture of the user;
    a finger gesture of the user;
    a button press;
    an eyebrow raise of the user;
    a wink of the user; and
    a further eye gaze having the same orientation as the eye gaze; or
    a further eye gaze having a different orientation as the eye gaze.

12. A device, comprising:
    a plurality of displays;
    a non-volatile memory configured to store program code;
    at least one processor coupled with the non-volatile memory and the plurality of displays and configured to execute the program code, wherein execution of the program code causes the at least one processor to perform the following:
    controlling at least one display to display a graphical user interface comprising a plurality of menu items;
    detecting a first user action at the at least one display comprising an eye gaze associated with eyes of a user;
    based on an orientation of the eye gaze of the first user action, selecting at least one first menu item from the plurality of menu items;
    detecting a second user action at a second display; and
    based on the second user action, activating a function from the at least one display associated with a given one of the at least one first menu item.

13. The device of claim 12, further comprising:
    the first user action and the second user action are issued in one context and within a predetermined temporal threshold;
    the second user action begins after the beginning of the second user action; and
    the first user action is persistent during at least a first part of the second user action.

14. The device of claim 12, the orientation of the eye gaze targets a further menu item different from the at least one first menu item; and
    in response to selecting the at least one first menu item, activating a visibility of the at least one first meu item.

15. The device of claim 12, further comprising highlighting the at least one first menu item in response to selecting the at least one first menu item, the highlighting of the at least one first menu item being selected from the group consisting of: a cursor symbol hovering above the at least one first menu item, a modified blur, a change in size, a change in geometric shape, a change in a wink from the user, a further eye gaze having the same orientation as the eye gaze of the first user action, and a further eye gaze having a different orientation as the eye gaze of the first user action.

16. The device of claim 12, further comprising tooltip information related to the function associated with a selected at least one menu item and depicted at a position of the selected at least one menu item.

17. The device of claim 12, further comprising a visibility of a further menu item that is different than the at least one first menu item being activated and the second user action being associated with the further menu item.

18. The device of claim 12, further comprising the second user action being at least one selected from the group consisting of: a hand gesture of the user, a finger gesture of the user, a button press, an eyebrow raise of the user, a wink of the user, a further eye gaze having the same orientation as the eye gaze of the first user action, and a further eye gaze having a different orientation than the eye gaze of the first user action.

\* \* \* \* \*